140-92.1 SR
3/3/87 OR H 000,225

United States Statutory Invention Registration [19]

[11] Reg. Number: H225
[43] Published: Mar. 3, 1987

Weixel

[54] HARNESS FORMATION END-EFFECTOR WITH INTERCHANGEABLE TOOL CAPABILITY

[75] Inventor: Mark Weixel, Howard County, Md.

[73] Assignee: The United States of America as represented by the Secretary of the Air Force, Washington, D.C.

[21] Appl. No.: 615,506

[22] Filed: May 30, 1984

[51] Int. Cl.[4] ..... B21F 3/00
[52] U.S. Cl. ..... 140/92.1; 29/739; 29/741; 81/423; 403/329
[58] Field of Search ..... 29/739, 741, 751; 140/92.1, 93 R; 29/283, 566.3, 566.4, 753; 18/421, 422, 423; 403/329; 29/748, 749

[56] References Cited

U.S. PATENT DOCUMENTS

| | | | |
|---|---|---|---|
| 1,859,425 | 5/1932 | Bell | 403/329 |
| 2,476,762 | 2/1946 | Petri et al. | 403/329 |
| 2,758,491 | 8/1956 | Buchanan | 81/15 |
| 2,823,565 | 2/1958 | Bohland | 81/423 |
| 2,824,472 | 2/1958 | Yeiser | 81/15 |
| 3,051,213 | 8/1962 | Batcheller | 153/1 |
| 3,177,952 | 8/1961 | West | 29/739 |
| 3,257,711 | 6/1966 | van Rijsewijk | 29/741 |
| 3,314,135 | 4/1967 | Smith | 29/203 |
| 3,641,650 | 2/1972 | Folk | 29/203 D |
| 3,862,482 | 1/1975 | Green | 29/203 DT |
| 3,984,092 | 10/1976 | Fitzpatrick | 81/422 |
| 4,005,518 | 2/1977 | Bakermans | 29/749 |
| 4,048,839 | 9/1977 | Peterpaul | 72/412 |
| 4,180,904 | 1/1980 | Nijman | 29/749 |

*Primary Examiner*—Harold J. Tudor
*Attorney, Agent, or Firm*—Donald J. Singer; James E. Maslow; Jacob N. Erlich

[57] ABSTRACT

A harness formation end-effector comprising a housing disposed for cooperable receipt and retention of a removable tool tip, wherein the tool tip may take the form of a contact insertion tool tip or a crimping tool tip or the like.

1 Claim, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
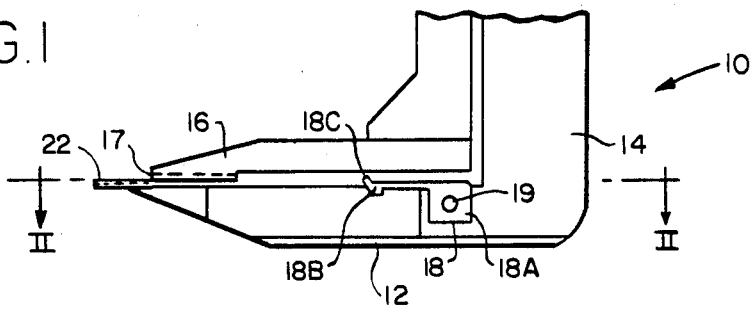
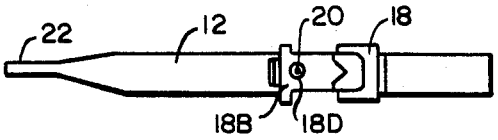
FIG. 2
FIG. 3
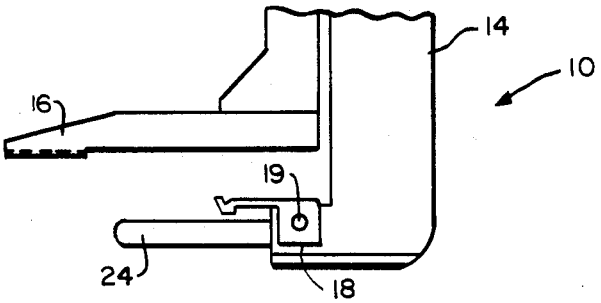
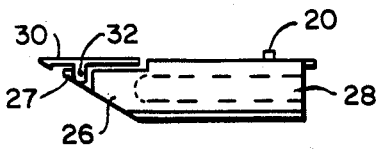
FIG. 4

HARNESS FORMATION END-EFFECTOR WITH INTERCHANGEABLE TOOL CAPABILITY

STATEMENT OF GOVERNMENT INTEREST

The invention described herein may be manufactured and used by or for the Government for governmental purposes without the payment of any royalty thereon.

BACKGROUND OF THE INVENTION

The present invention relates to harness formation end-effectors, and, more particularly, to a harness formation end-effector with interchangeable tool tips.

Wire harness formation end-effectors are known in the art. Such devices enable mechanical effecting of desired wire lay, where each wire of a wire harness is terminated in a particular manner. Such end-effectors ordinarily are dedicated to a particular function and thus are permanently terminated with a particular type of tool tip. One problem with such arrangements, however, where a particular robot device is dedicated to a particular type of wire termination arrangement, is that in order to facilitate attachment of an other-than-standard-size contact, or to otherwise terminate an end of a wire of a wire bundle, the end-effector must be manually reconstituted to accommodate such non-standard function, where the particular tool tip on the end-effector must be removed by a worker with an appropriate tool tip being substituted therefor. This results in time-consuming and wasteful production requirements.

SUMMARY OF THE INVENTION

It is therefore an object of the present invention to facilitate a simplified manner of adapting a robot end-effector to a variety of tool tips according to desired termination styles to be applied to wires of a wire harness under construction.

The subject invention comprises a harness formation end-effector which is cooperable with one of a variety of interchangeable tool tips. For example, an insertion tool tip is employed when termination comprises insertion of a contact into a connector. In the alternative, a tool tip may comprise an anvil, which anvil may be used to terminate a wire in a crimp fashion. Other tool tips also may be selectively applied to the device. The harness formation end-effector is so comprised so as to be able to selectively receive a selected one of the above-said tool tips, where a spring latch fastens the tool tip to the end-effector. A tool tip can be released from the end-effector by means of releasing the abovesaid spring latch and by withdrawing the tool tip therefrom.

DESCRIPTION OF THE DRAWINGS

The invention will be more clearly understood by reference to the following detailed description of a preferred embodiment thereof in conjunction with the accompanying drawings, in which:

FIG. 1 is a side view of the harness formation end-effector with tool tip attached;

FIG. 2 is a sectional view of a portion of the invention taken along line II—II of FIG. 1;

FIG. 3 is a side view of the harness formation end-effector with tool tip removed; and FIG. 4 is a side view of an exemplary alternative tool tip.

DETAILED DESCRIPTION OF THE PREFERRED EMBODIMENT

Referring now to FIG. 1 there is shown a harness formation end-effector 10 having an exemplary removable tool tip 12 affixed thereto. End-effector 10 is coupled to a robotic manipulator (not shown) via housing 14. End-effector 10 further comprises a finger 16 fixedly attached to and extending out from housing 14. Finger 16 is terminated at its outermost extended end by anvil formation 17.

Attached to housing 14 by means of a transverse mounting pin 19 is a spring clip 18 having a body section **18*a* and a retention section 18*b*. A flange 18*c* is defined at the end of spring retention section 18*b*. By means of spring clip 18, tool tip 12 may be releasably retained on the end-effector 10**, as will be understood by those of ordinary skill in the art, and as further described below.

Referring now to FIG. 2, there is shown a sectional view taken along line II—II of FIG. 1. As seen in FIG. 2, spring retention section **18*b* defines in its top planar surface an opening 18*d* which cooperates with a latch pin 20 of tool tip 12 to enable said releasable retention of tool tip 12 on the end-effector 10. In this embodiment, tool tip 12 comprises a second anvil 22, which anvil 22 cooperates with anvil 17 of finger 16. This anvil pair 17, 22** may be cooperatively employed for crimping functions and to facilitate terminating crimp lug ends and tinned ends into a mechancal holder.

Referring now to FIG. 3, there is shown the end-effector 10 of FIG. 1 with tool tip 12 removed. In this view it can be seen that a support shaft 24 extends transverse to housing 14 parallel to finger 16. Shaft 24 is a structural member which slideably cooperates in a manner described below with a tool tip to be affixed to end-effector tool 10, and, therefore, is comprised of a material of appropriate rigidity.

Referring now to FIG. 4, there is shown an alternative tool tip 26, which tool tip 26 comprises a latch pin 20 and an interiorly defined recess 28. It will be appreciated, however, that tool tip 12 comprises a like interiorly defined recess 28, and it will thus now be understood that each tool tip will comprise a like interiorly defined recess 28 so as to enable positive engagement of any such tool tip with shaft 24. Tool tip 26 comprises an insertion element 30 pivotally mounted to terminus 27 of tool tip 26 by means of transverse mounting pin 32. Other alternative configurations of tool tips 12 and 26 are also within the spirit and scope of the present invention, although not shown in detail herein.

In operation, a tool tip, such as tool tip 26, is mounted on end-effector 10 by means of cooperation of shaft 24 and interiorly defined recess 28 within the tool tip. When tool tip 26 is fully mated with end-effector 10 at shaft 24, opening **18*d* defined within spring clip 18 cooperates with latch pin 20 to selectively fixedly retain tool tip 26 on the end-effector 10 at shaft 24, whereupon a wire lay and termination operation may proceed. When a different tool tip is desired to be used, the spring clip 18 is deformed to release the latch pin 20 of tool tip 26, and tool tip 26 can thus be removed thereafter. An alternative tool tip may then be inserted on shaft 24 and affixed similarly to end-effector 10**.

While the present invention has been described in connection with rather specific embodiments thereof, it will be understood that many modifications and variations will be readily apparent to those of ordinary skill in the art and that this application is intended to cover any adaptation or variation thereof. Therefore, it is manifestly intended that this invention be only limited by the claims and the equivalents thereof.

What is claimed is:

1. A robotic end-effector system comprising:

a robotic manipulator;

an end-effector device with interchangeable tool capability, said end-effector device including a housing connected to said robotic manipulator, a finger fixedly mated to said housing, means for retaining a removable tool tip coupled to said housing, said retaining means extending parallel to said finger and having a tool tip receiving shaft, a spring clip having a body section for mounting said spring clip on said housing and a flexing section having a recess in its top planar surface;

a removable tool tip, said tool tip having an interiorly defined recess therein, said tool tip cooperating with said receiving shaft at said interiorly defined recess, and said tool tip having a latch pin thereon cooperable with said recess of said spring clip for retention of said removable tool tip on said housing; and an insertion element pivotally mounted to the end of said tool tip by means of a transverse mounting pin and said insertion element being in cooperative relationship with said finger.

* * * * *